(12) United States Patent
Su

(10) Patent No.: US 8,083,567 B2
(45) Date of Patent: Dec. 27, 2011

(54) SIMULATED EYE

(75) Inventor: Xiao-Guang Su, Shenzhen (CN)

(73) Assignees: Hong Fu Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 362 days.

(21) Appl. No.: 12/558,593

(22) Filed: Sep. 14, 2009

(65) Prior Publication Data

US 2010/0112895 A1 May 6, 2010

(30) Foreign Application Priority Data

Oct. 31, 2008 (CN) .......................... 2008 1 0305357

(51) Int. Cl.
*A63H 3/38* (2006.01)
(52) U.S. Cl. ........................................ 446/392; 446/389
(58) Field of Classification Search .................. 446/389, 446/392; 623/4.1
See application file for complete search history.

(56) References Cited

U.S. PATENT DOCUMENTS

| | | | | |
|---|---|---|---|---|
| 809,445 A * | 1/1906 | Jelliffe | ............................ | 40/518 |
| 3,905,130 A * | 9/1975 | Gordon et al. | ................ | 434/271 |
| 4,332,039 A * | 6/1982 | LaFuente | ..................... | 623/6.64 |
| 5,061,279 A * | 10/1991 | Friel | ............................. | 623/6.64 |
| 5,108,427 A * | 4/1992 | Majercik et al. | ............. | 623/5.12 |
| 5,900,923 A * | 5/1999 | Prendergast et al. | ......... | 351/221 |
| 6,391,057 B1 * | 5/2002 | Schleipman et al. | ........ | 623/6.64 |
| 7,485,025 B2 * | 2/2009 | Schnuckle | .................... | 446/392 |

* cited by examiner

*Primary Examiner* — Gene Kim
*Assistant Examiner* — Alyssa Hylinski
(74) *Attorney, Agent, or Firm* — Altis Law Group, Inc.

(57) ABSTRACT

A simulated eye includes an eyeball, a first winding mechanism with a spool, a first driving member, a second winding mechanism with a reel, a second driving member and a strip. The first driving member is configured for driving the first winding mechanism to rotate in a first direction and a second direction opposite to the first direction. The second driving member is configured for driving the second winding mechanism to rotate in the first direction and the second direction. The strip has two ends wound around the spool and the reel correspondingly. The strip is wound around the spool when the first driving member and the second driving member rotate the first winding mechanism and the second winding mechanism in the first direction correspondingly.

20 Claims, 6 Drawing Sheets

SIMULATED EYE

BACKGROUND

1. Technical Field

The present disclosure relates to replicas of human organs, and particularly to a replica of an eye.

2. Description of Related Art

A typical replica of a human eye allow such simulations as the eyelid opening and closing. Accordingly, other simulation effects are needed to make the eyes more lifelike.

Therefore, what is needed is a simulated eye capable of replicating human eye behavior.

DETAILED DESCRIPTION

Figure 1:
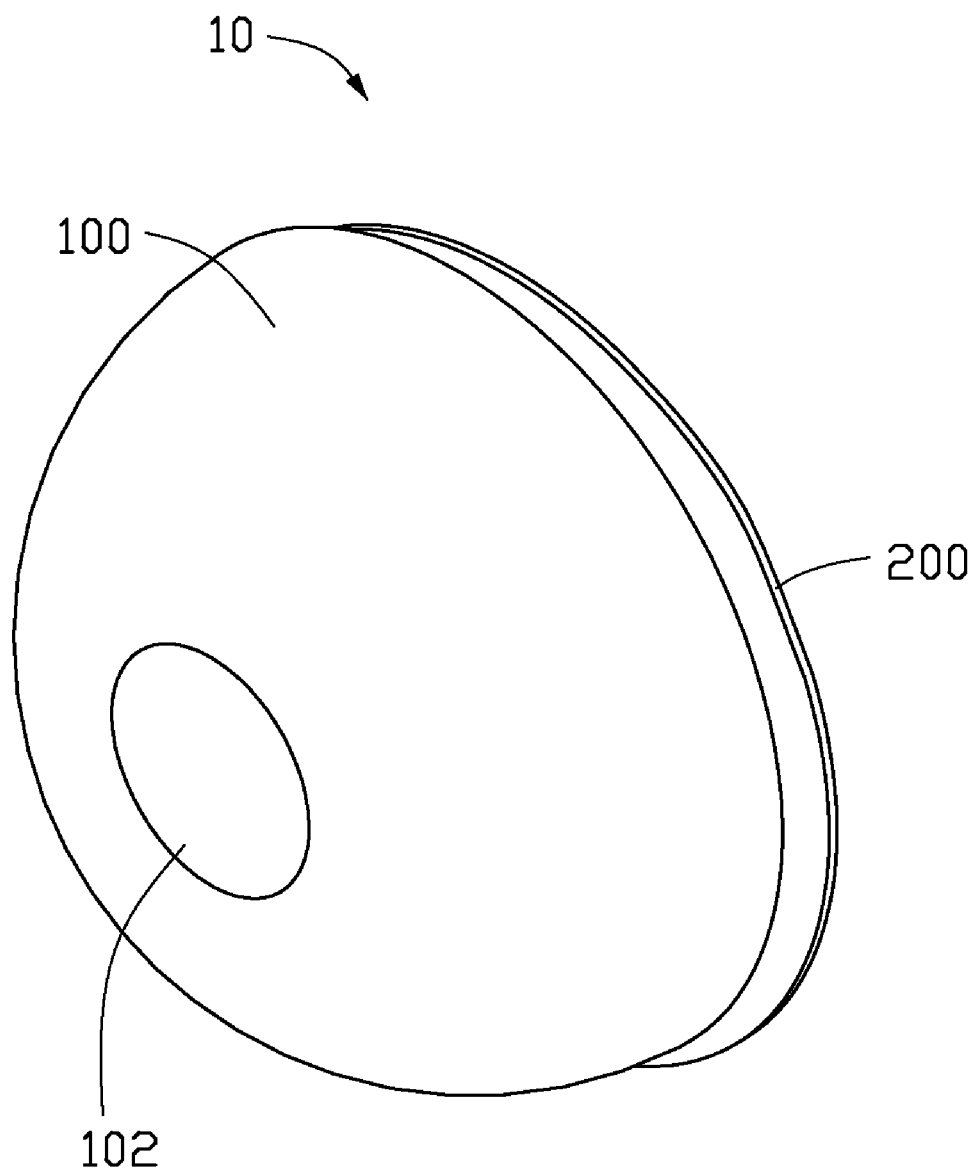
FIG. 1 is an isometric view of a simulated eye in accordance with an exemplary embodiment.

Referring to FIG. 1, a simulated eye 10 includes a spherical cap eyeball 100, and a circular fastening board 200 fixed on back of the spherical cap eyeball 100. In use, either the eyeball 100 or the fastening board 200 may be fastened to other components (not shown).

Figure 2:
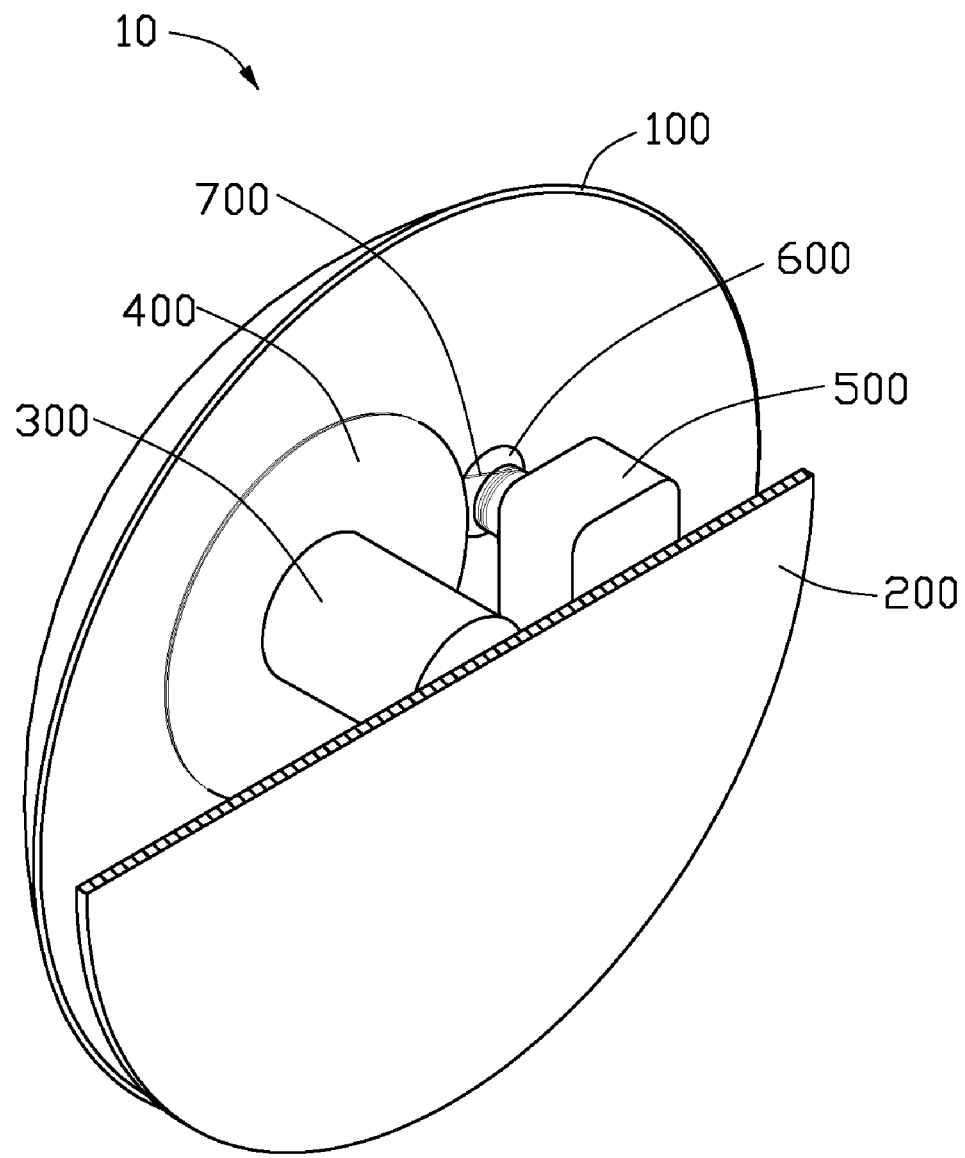
FIG. 2 is a partially isometric view of the simulated eye of FIG. 1.
Figure 3:
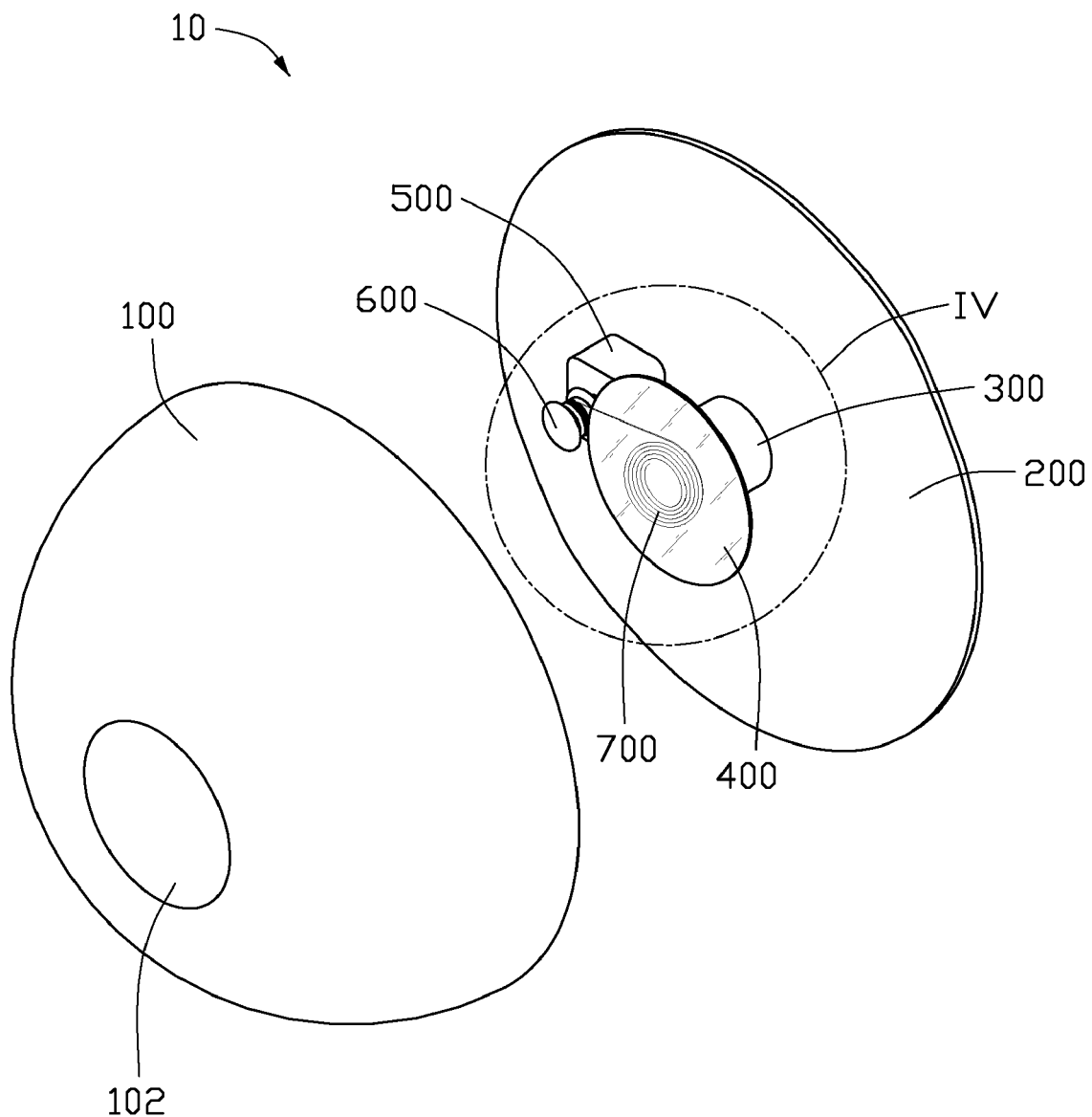
FIG. 3 is an exploded view of the simulated eye of FIG. 1.

Referring to FIGS. 2 and 3, the simulated eye 10 further includes a first driving member 300 and a second driving member 500 mounted on the fastening board 200, a first winding mechanism 400 driven by the first driving member 300 and a second winding mechanism 600 driven by the second driving member 500, and a strip 700. The first and second driving members 300, 500 and the winding mechanisms 400, 600 are received in the eyeball 100.

The eyeball 100 has a circular transparent area 102 capable of transmitting light. The transparent area 102 is arranged on the front of the eyeball 110.

The first driving member 300 is mounted in the center of the fastening board 200. The first driving member 300 is used for rotating the first winding mechanism 400. The second driving member 500 is disposed adjacent to the first driving member 300. The second driving member 500 is used for rotating the second winding mechanism 400. The first and second driving members 300, 500 may be motors.

Figure 4:
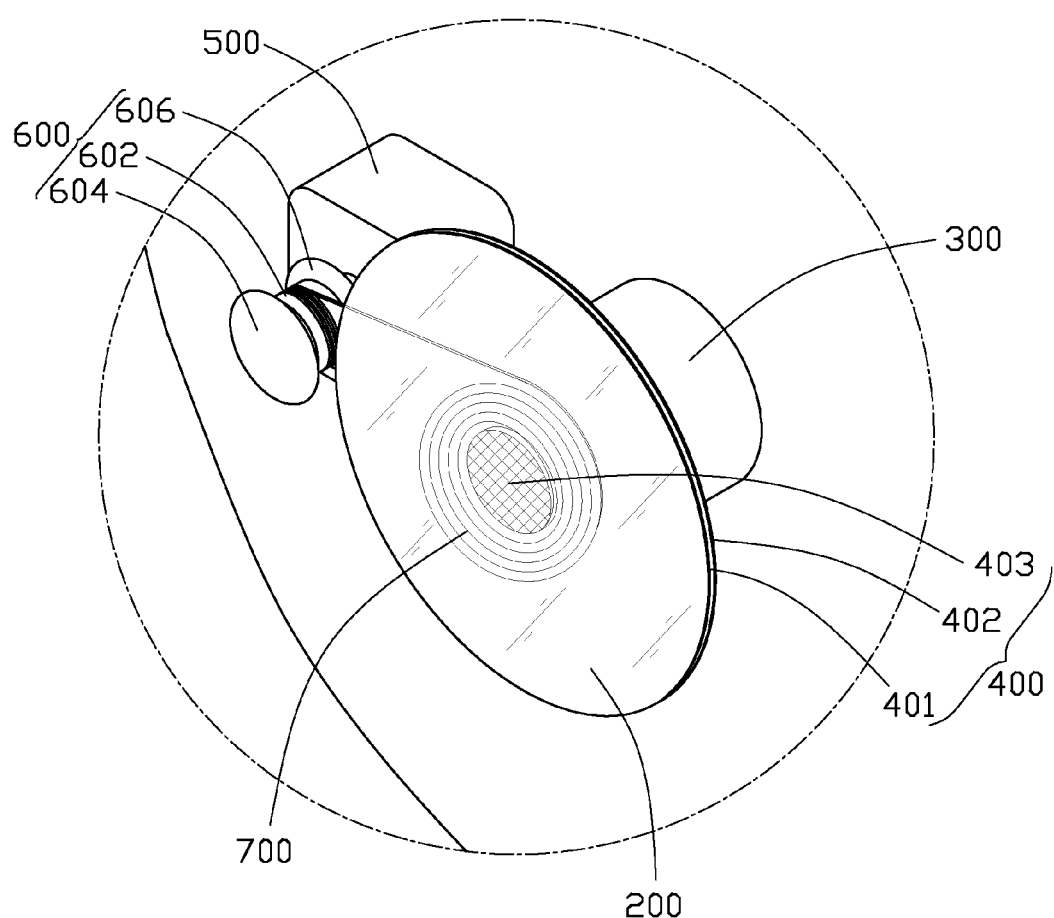
FIG. 4 an enlarged view of a circled portion IV of FIG. 3.

Referring to FIG. 4, the first winding mechanism 400 includes a spool 403, a first rim 401, and a second rim 402 protruding from peripheries of opposite ends of the spool 403. The first rim 401 is made of transparent material and faces the transparent area 102. The second rim 402 is parallel to the first rim 401. The first winding mechanism 400 may be a bobbin. The first and second rims 401, 402 may be circular. Diameters of the first rim 401 and the second rim 402 equal or exceed that of the transparent area 102.

The second winding mechanism 600 includes a reel 602, a first brim 604 and a second brim 606 protruding from peripheries of opposite ends of the reel 602. The first brim 604 parallel to the second brim 606 faces the transparent area 102. The second winding mechanism 600 may be similar to the first winding mechanism 400 in shape. The second winding mechanism 600 is also a bobbin. The first and second rims 604, 606 are circular.

The strip 700, two ends of which are wound around the spool 403 and the reel 602 respectively, is as wide or narrower than heights of the spool 403 and the reel 602.

In use, the spool 403 at the end of the first rim 401 may be a first color, such as black, to be used as a constant portion of a pupil. The strip 700 may be similar with the spool 403 at the end of the first rim 401 in color for being used as a variable portion of the pupil. The second rim 402 may be a second color other than the first color, such as blue or brown, to replicate an iris.

Figure 5:
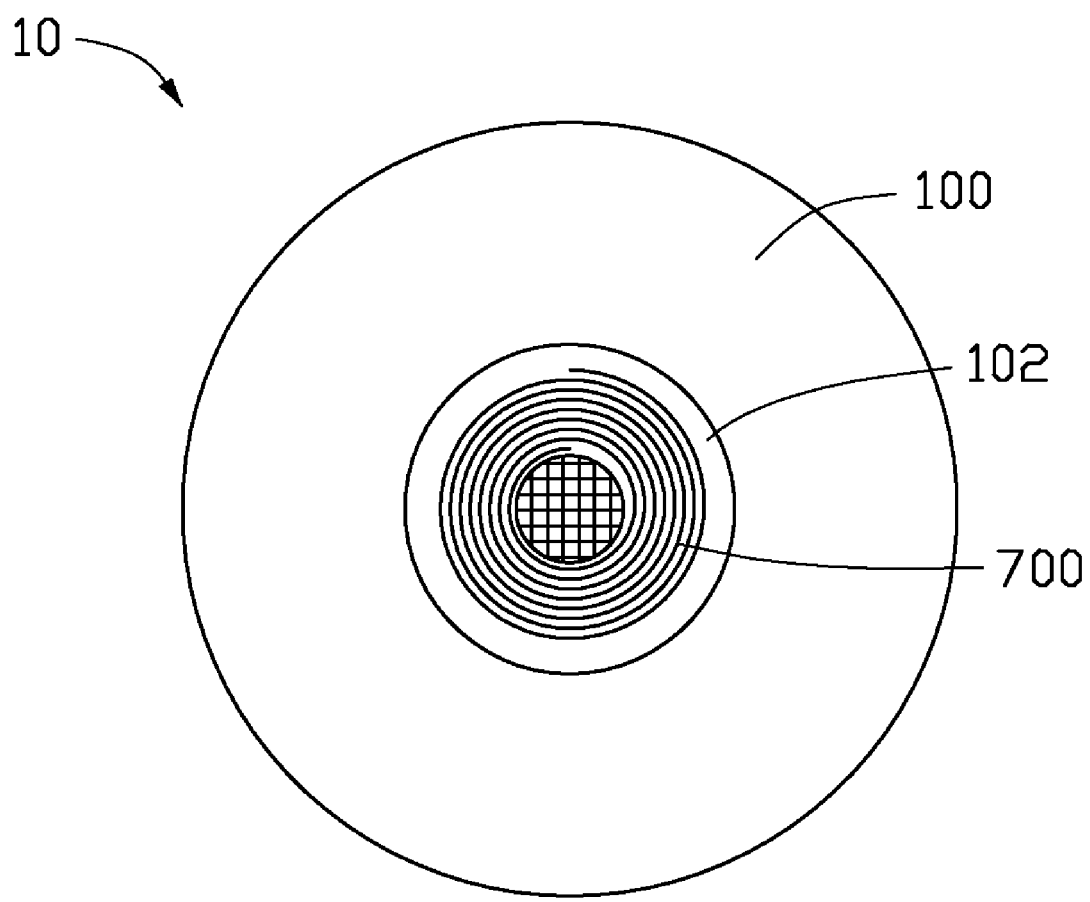
FIG. 5 is a schematic view of the simulated eye of FIG. 1 in a first state.

When the first driving member 300 and the second driving member 500 correspondingly rotate the first winding mechanism 400 and the second winding mechanism in a first direction such as clockwise, the first winding mechanism 400 and second winding mechanism 600 wind the strip 700 multiple turns around the spool 403 from the reel 602 (referring to FIG. 5), thus the pupil, composed of the spool 403 at the end of the first rim 401 and the strip 700 wound around the spool 403 replicates dilation.

Figure 6:
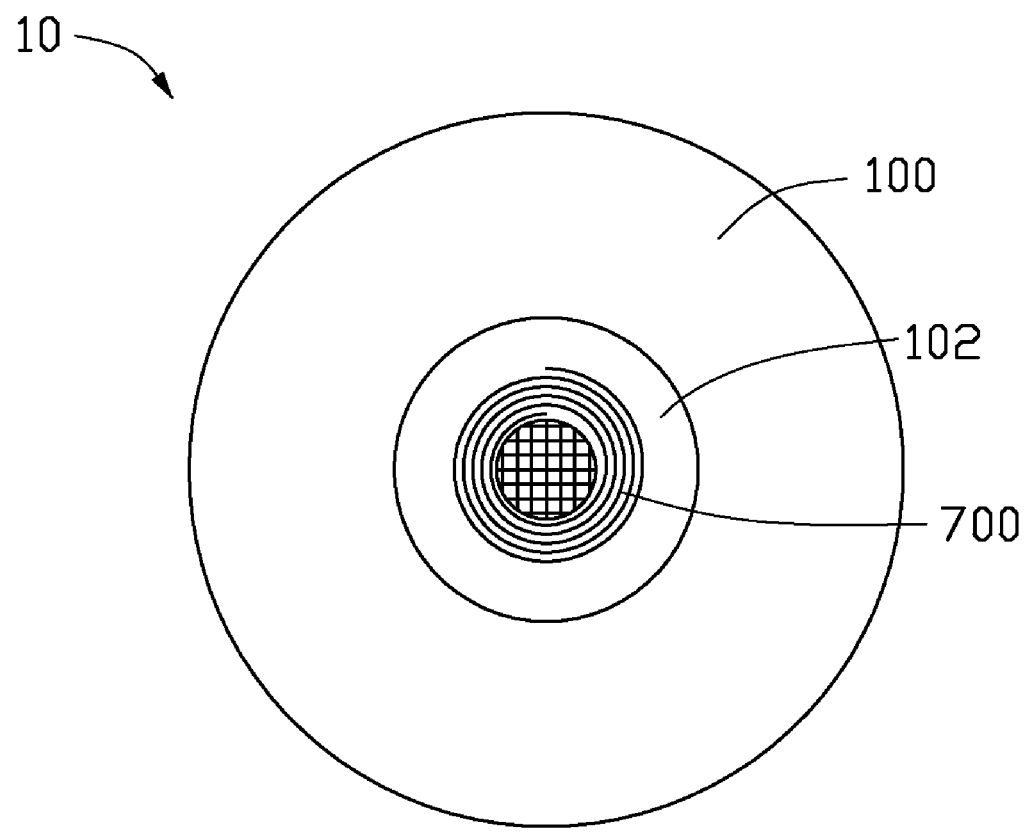
FIG. 6 is a schematic view of the simulated eye of FIG. 1 in a second state.

When the first driving member 300 and the second driving member 500 correspondingly rotate the first winding mechanism 400 and the second winding mechanism 600 in a second direction opposite to the first direction, such as counter-clockwise, the first winding mechanism 400 and second winding mechanism 600 wind the strip 700 multiple turns around the reel 602 from the spool (referring to FIG. 6). Correspondingly, the pupil composed of the spool 403 at the end of the first rim 401 and the strip 700 wound around the spool 403 replicates contraction.

In other embodiments, the first driving member 300 or the second driving member 500 may be a resilient reel capable of generating restoring forces, and the other one may be a motor. For example, the first driving member 300 is motor, and the second driving member 500 is the resilient reel. When the first driving member 300 rotates the first winding mechanism 400, the first winding mechanism 400 drives the strip 700 to wound around the spool 403 from the reel 602, meanwhile the second driving member 500 generates the restoring force. When the first driving member 300 stops rotating the first winding mechanism 400, the second driving member 500 winds the strip 700 around the reel 602 from the spool 403 via the restoring forces generated by the second driving member 500.

In another embodiment, at least one of the first driving member 300 and the second driving member 500 can be omitted. Correspondingly, at least one of the first driving member 300 and the second driving member 500 may be driven manually.

It is to be understood, however, that even though numerous information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A simulated eye, comprising:
   an eyeball in a spherical cap shape;
   a first winding mechanism with a spool;
   a first driving member configured for rotating the first winding mechanism in a first direction and a second direction opposite to the first direction;

a second winding mechanism with a reel;
a second driving member configured for rotating the second winding mechanism in the first direction and the second direction; and
a strip, two ends of which are wound around the spool and the reel correspondingly, the strip being wound around the spool when the first driving member and the second driving member drive the first winding mechanism and the second winding mechanism to rotate in the first direction correspondingly, the strip being wound around the reel when the first driving member and the second driving member rotate the first winding mechanism and the second winding mechanism in the second direction;
wherein the first winding mechanism is arranged between the eyeball and the first driving member, and the first winding mechanism is visible from the exterior of the eyeball.

2. The simulated eye according to claim 1, wherein the simulated eye is hemispherical; the simulated eye further comprises a fastening board fixed on back of the eyeball, the first driving member and the second driving member are fixed on the fastening board and received in the eyeball.

3. The simulated eye according to claim 2, wherein the first driving member is arranged on a center of the fastening board.

4. The simulated eye according to claim 1, wherein the first winding mechanism further comprises first and second rims protruding from peripheries of opposite ends of the spool.

5. The simulated eye according to claim 4, wherein the first rim is adjacent to the eyeball and transparent; the spool end adjacent the first rim is a first color, the second rim is a second color other than the first color, the strip is similar with the spool end adjacent the first rim in color.

6. The simulated eye according to claim 4, wherein the first winding mechanism is a bobbin, the first and the second rims are circular.

7. The simulated eye according to claim 1, wherein a width of the strip is equal to or less than a height of the spool and the reel.

8. The simulated eye according to claim 1, wherein the second winding mechanism further comprises a first brim and a second brim protruding from peripheries of opposite ends of the reel.

9. The simulated eye according to claim 1, wherein the first driving member and the second driving member are motors.

10. The simulated eye according to claim 1, wherein the eyeball comprises a transparent area corresponding to the first winding mechanism, the transparent area is capable of transmitting light so that the first winding mechanism is visible from the exterior of the eyeball.

11. A simulated eye, comprising:
an eyeball in a spherical cap shape;
a first winding mechanism with a spool received in the eyeball, and one end of the spool facing the eyeball being a first color to replicate a constant portion of a pupil;
a second winding mechanism with a reel received in the eyeball; and
a strip with two ends wound around the spool and the reel correspondingly, the strip being similar in color with the end of the spool facing the eyeball for replicating a variable portion of the pupil;
wherein the strip switches between a first state and a second state, in the first state, the strip is wound around the spool from the reel, in order that the pupil composed of the end of the spool facing the eyeball and the strip wound around the spool replicate dilation; and in the second state, the strip is wound around the reel from the spool, in order that the pupil composed of the end of the spool facing the eyeball and the strip wound around the spool replicates contraction.

12. The simulated eye according to claim 11, wherein the eyeball comprises a transparent area corresponding to the first winding mechanism, the transparent area capable of transmitting light so that the first winding mechanism is visible from the exterior of the eyeball.

13. The simulated eye according to claim 11, further comprising a fastening board fixed on back of the eyeball, on which a first driving member and a second driving member are fixed.

14. The simulated eye according to claim 11, further comprising a first driving member for rotating the first winding mechanism and a second driving member for rotating the second winding mechanism, when the first driving member and the second driving member rotate the first winding mechanism and the second driving member in a first direction correspondingly, the strip is wound around the spool from the reel.

15. The simulated eye according to claim 14, wherein when the first driving member and the second driving member rotate the first winding mechanism and the second driving member in a second direction opposite to the first direction correspondingly, the strip is wound around the reel from the spool.

16. The simulated eye according to claim 14, wherein the first driving member and the second driving member are motors.

17. The simulated eye according to claim 11, further comprising a motor for driving the first winding mechanism and a resilient reel capable of generating restoring forces for driving the second mechanism, wherein when the motor rotates the first winding mechanism, the first winding mechanism winds the strip around the spool from the reel, at the same time that the resilient reel generates the restoring forces; and when the motor stops rotating the first winding mechanism, the resilient reel winds the strip around the reel from the spool via the restoring forces.

18. The simulated eye according to claim 11, wherein a width of the strip is equal to or less than a height of the spool and the reel.

19. The simulated eye according to claim 11, wherein the first winding mechanism further comprises first and second rims protruding from peripheries of opposite ends of the spool.

20. The simulated eye according to claim 19, wherein the second rim is a second color other than the first color, replicating an iris.

* * * * *

UNITED STATES PATENT AND TRADEMARK OFFICE
CERTIFICATE OF CORRECTION

PATENT NO. : 8,083,567 B2  
APPLICATION NO. : 12/558593  
DATED : December 27, 2011  
INVENTOR(S) : Xiao-Guang Su It is certified that error appears in the above-identified patent and that said Letters Patent is hereby corrected as shown below:

On the Title Page

Please replace Item (73) regarding "Assignees" with the following:

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW).

Signed and Sealed this
Twenty-second Day of May, 2012

David J. Kappos
*Director of the United States Patent and Trademark Office*